United States Patent [19]

Reed

[11] Patent Number: 5,317,813
[45] Date of Patent: Jun. 7, 1994

[54] CARPENTRY MEASURING TOOL

[76] Inventor: Stephen D. Reed, 740 Glenrock Rd., West Kingston, R.I. 02892

[21] Appl. No.: 123,050

[22] Filed: Sep. 20, 1993

[51] Int. Cl.⁵ .................................................. G01B 3/08
[52] U.S. Cl. ........................................ 33/809; 33/348; 33/488
[58] Field of Search ................ 33/809, 464, 348, 484, 33/485, 488

[56] References Cited

U.S. PATENT DOCUMENTS

| | | | |
|---|---|---|---|
| 676,161 | 6/1901 | Sullivan | 33/348 |
| 2,232,824 | 2/1941 | Maher | 33/809 |
| 3,093,919 | 6/1963 | Holtz | 33/493 |
| 3,190,008 | 6/1965 | Weiss | 33/809 |
| 3,492,729 | 2/1970 | Crain | 33/809 |
| 3,492,737 | 2/1970 | Swanson | 33/809 |
| 4,180,914 | 1/1980 | Lechner | 33/809 |
| 4,899,452 | 2/1990 | Schafer | 33/809 |
| 4,944,097 | 7/1990 | Kang | 33/760 |
| 5,038,493 | 8/1991 | Stabs | 33/809 |

FOREIGN PATENT DOCUMENTS

871520 3/1953 Fed. Rep. of Germany ........ 33/809
2631111 11/1989 France .................................... 33/809

*Primary Examiner*—Thomas B. Will
*Attorney, Agent, or Firm*—E. Michael Combs

[57] ABSTRACT

A carpentry tool employs a base tube having a window directed therethrough, with an intermediate tube having a scale recessed within the intermediate tube and a view through window, with an outer tube telescopingly directed through the intermediate tube, with the intermediate tube, the outer tube, and the base tube coaxially aligned relative to one another. The outer tube is arranged in typical foot graduations, the intermediate tube in inch graduations readable through the window. The outer tube and intermediate tube are arranged for nested orientation within the base tube. A modification of the invention includes an illuminated magnification lens mounted coextensively within the window for ease of viewing of the scale of the intermediate tube.

1 Claim, 4 Drawing Sheets

CARPENTRY MEASURING TOOL

BACKGROUND OF THE INVENTION

1. Field of the Invention

The field of invention relates to measuring tool structure, and more particularly pertains to a new and improved carpentry measuring tool wherein the same is directed to the measuring of lengths in a carpentry work environment.

2. Description of the Prior Art

Carpentry tools of various types are utilized throughout the prior art typically to measure dimensions between studs and the like, such as indicated in the U.S. Pat. Nos. 4,223,445; 3,492,737; and 4,638,563.

The instant invention attempts to overcome deficiencies of the prior art by providing for a compact structure arranged for measuring of distance between opposed components such as in a carpentry structure and in this respect, the present invention substantially fulfills this need.

SUMMARY OF THE INVENTION

In view of the foregoing disadvantages inherent in the known types of carpentry tool apparatus now present in the prior art, the present invention provides a carpentry measuring tool wherein the same is directed to the measuring of distance between spaced components. As such, the general purpose of the present invention, which will be described subsequently in greater detail, is to provide a new and improved carpentry measuring tool which has all the advantages of the prior art carpentry measuring tools and none of the disadvantages.

To attain this, the present invention provides a carpentry tool employing a base tube having a window directed therethrough, with an intermediate tube having a scale recessed within the intermediate tube and a view through window, with an outer tube telescopingly directed through the intermediate tube, with the intermediate tube, the outer tube, and the base tube coaxially aligned relative to one another. The outer tube is arranged in typical foot graduations, the intermediate tube in inch graduations readable through the window. The outer tube and intermediate tube are arranged for nested orientation within the base tube. A modification of the invention includes an illuminated magnification lens mounted coextensively within the window for ease of viewing of the scale of the intermediate tube.

My invention resides not in any one of these features per se, but rather in the particular combination of all of them herein disclosed and claimed and it is distinguished from the prior art in this particular combination of all of its structures for the functions specified.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. Those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved carpentry measuring tool which has all the advantages of the prior art carpentry measuring tools and none of the disadvantages.

It is another object of the present invention to provide a new and improved carpentry measuring tool which may be easily and efficiently manufactured and marketed.

It is a further object of the present invention to provide a new and improved carpentry measuring tool which is of a durable and reliable construction.

An even further object of the present invention is to provide a new and improved carpentry measuring tool which is susceptible of a low cost of manufacture with regard to both materials and labor, and which accordingly is then susceptible of low prices of sale to the consuming public, thereby making such carpentry measuring tools economically available to the buying public.

Still yet another object of the present invention is to provide a new and improved carpentry measuring tool which provides in the apparatuses and methods of the prior art some of the advantages thereof, while simultaneously overcoming some of the disadvantages normally associated therewith.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
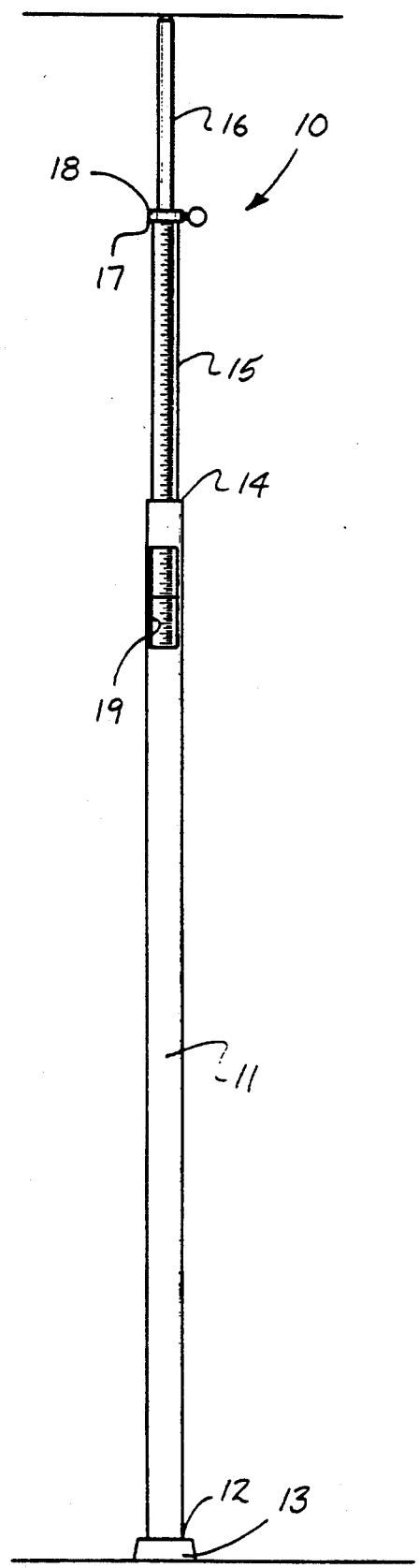
FIG. 1 is an orthographic view of the invention.
Figure 2:
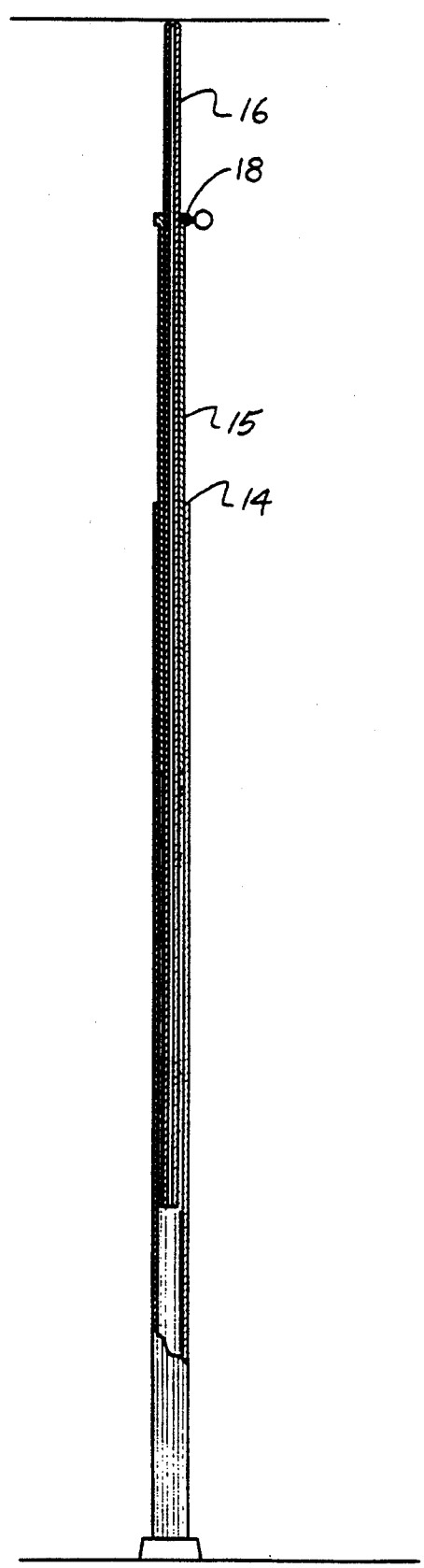
FIG. 2 is an orthographic cross-sectional illustration of the invention.

With reference now to the drawings, and in particular to FIGS. 1 to 9 thereof, a new and improved carpentry measuring tool embodying the principles and concepts of the present invention and generally designated by the reference numeral 10 will be described.

More specifically, the carpentry measuring tool 10 of the instant invention essentially comprises a base tube 11 having a predetermined base tube length, having a base tube first end 12 spaced from a resilient base 13. A resilient base 13 is mounted onto the base tube first end 12 for ease of positioning of the tool structure. Directed through the base tube second end 14 coaxially aligned therewith is an intermediate tube 15, with an outer tube 16 reciprocatably mounted from the intermediate tube 15. The intermediate tube includes an intermediate tube first end 17a (see FIG. 7), with the intermediate tube second end 17 having a clamp 18 mounted thereon for clamping the outer tube relative to the intermediate tube. A window 19 is mounted within the base tube in adjacency to the base tube second end, as illustrated in FIG. 1 for example.

Figures 3, 4, 5:
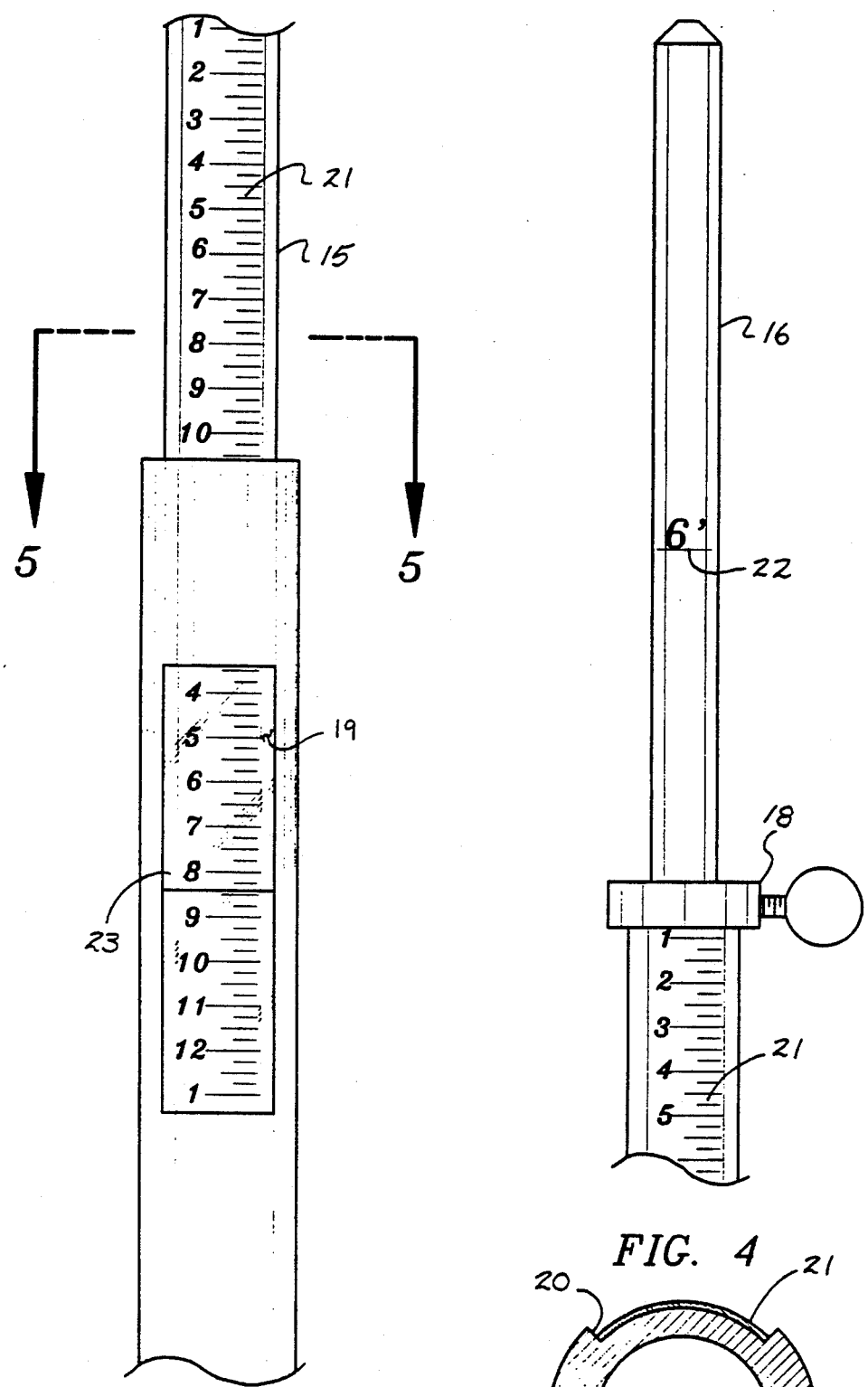
FIG. 3 is an enlarged orthographic view of the window structure in cooperation with the intermediate tube.
FIG. 4 is an enlarged orthographic of the outer tube extensively mounted relative to the intermediate tube.
FIG. 5 is an orthographic view, taken along the lines 5—5 of FIG. 4 in the direction indicated by the arrows.

The intermediate tube includes an intermediate tube arcuate recess 20 directed within the outer wall of the intermediate tube, with the recess concentric relative to the intermediate tube. An intermediate tube scale plate 21 is accordingly received within the arcuate recess 20. It is desired such that the intermediate tube scale plate 21 is formed of a magnetic material, and the intermediate tube formed of ferrous metallic material to permit ease of replacement of the scale plate 21 to accommodate various graduation systems. The outer tube 16 is measured typically in feet, but it is understood that it may be measured in any of a variety of standardized length such as metric and the like. The outer tube 16 includes an outer tube scale 22 that is of ascending graduation from the free distal end of the outer tube to the intermediate tube second end, such that the greater the extension of the outer tube, the greater the numerical reading along the outer tube scale 22. The intermediate tube includes graduation such that, as illustrated in FIGS. 3 and 4, should the intermediate tube be withdrawn to the six foot mark, the extension of the intermediate tube to indicate six feet plus the reading on the intermediate tube provides for indication of overall length as the graduations of the outer tube accommodate the predetermined base tube length.

Figure 6:
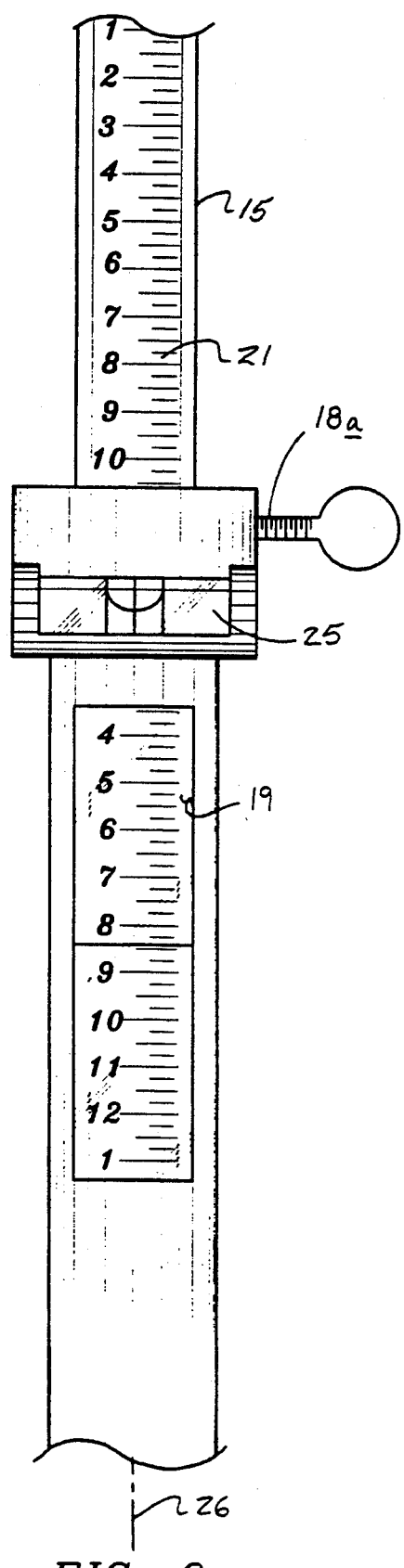
FIG. 6 is an orthographic view of the intermediate tube indicating the use of a spirit level.

The FIG. 6 indicates the base tube, and specifically the use of a base tube clamp 18a, including a spirit level 25 mounted thereon to provide for proper vertical alignment of the tool structure in use. Further, the spirit level is orthogonally oriented relative to the axis 26 about which the base tube, the intermediate tube, and the outer tube are symmetrically oriented.

Figure 7:
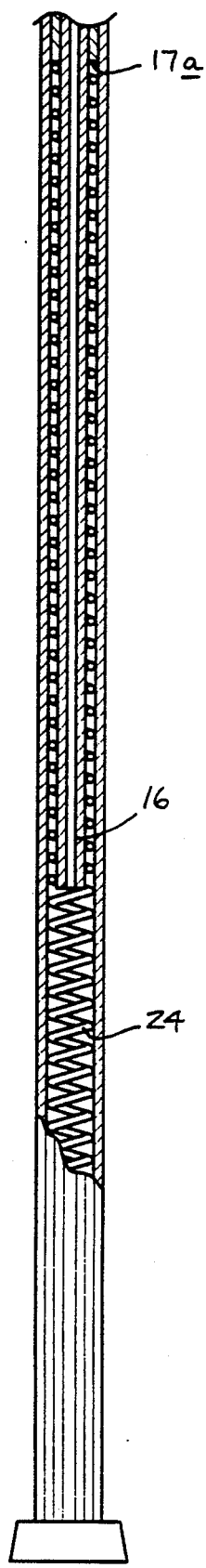
FIG. 7 is an orthographic partial cross-sectional illustration of the telescopic mounting of the intermediate tube and outer tube within the base tube.

The FIG. 7 indicates the use of a spring member 24 captured between the intermediate tube first end and the base tube first end to provide for biased extension of the intermediate tube relative to the base tube, whereupon locking of the clamp 18 locks the intermediate tube relative to the base tube in use, such that sliding of the outer tube relative to the inner tube is still available as the outer tube 16 is directed medially through the spring structure 24.

Figure 8:
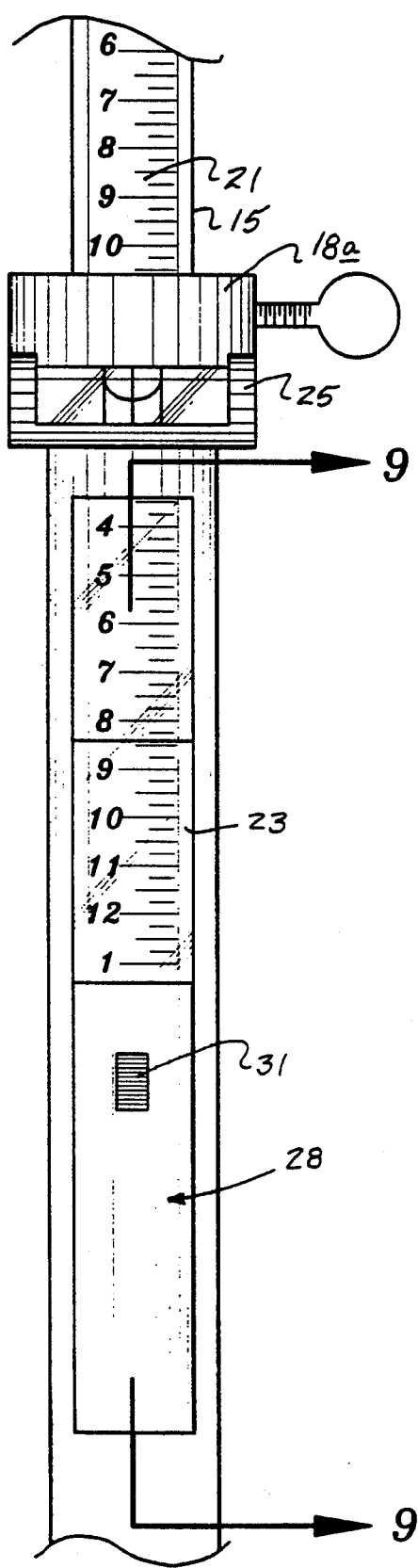
FIG. 8 is an enlarged orthographic view of the window structure and lens mounted therewithin.
Figure 9:
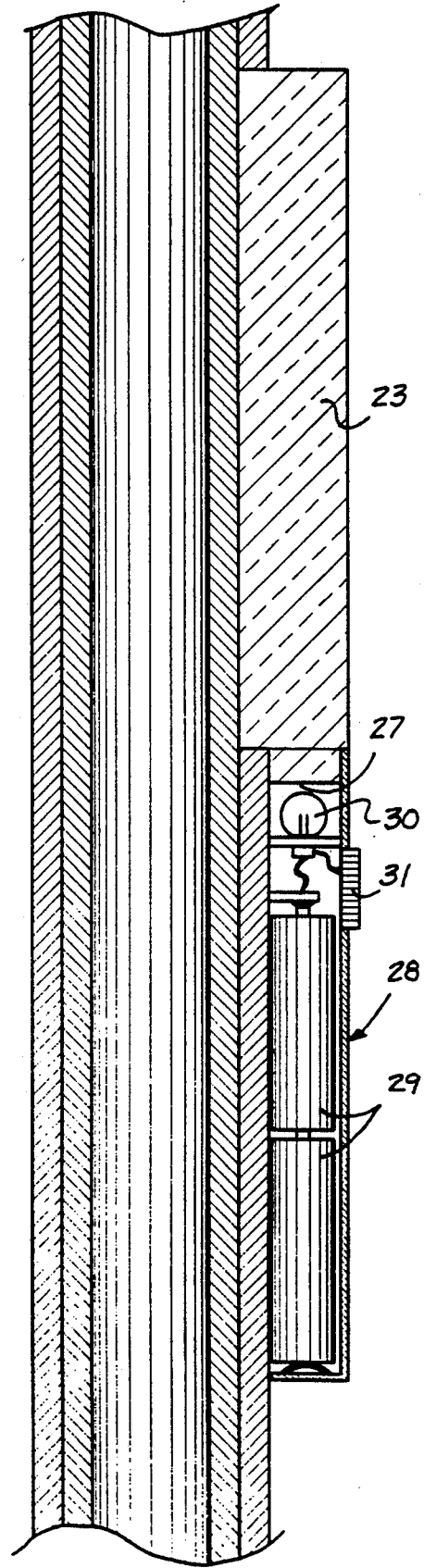
FIG. 9 is an orthographic view, taken along the lines 9—9 of FIG. 8 in the direction indicated by the arrows.

The FIGS. 8 and 9 indicate the use of an illumination housing 28, such that a lens 23 mounted within the window 19 includes a lens end wall 27 in facing relationship with the illumination housing, such that at least one battery 29 cooperative through an on/off switch 31 effects illumination of the illumination bulb 30 positioned adjacent the lens end wall 27 to provide illumination through the lens 23 and enhanced viewing of the intermediate tube scale plate 21.

As to the manner of usage and operation of the instant invention, the same should be apparent from the above disclosure, and accordingly no further discussion relative to the manner of usage and operation of the instant invention shall be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A carpentry measuring tool, comprising, a base tube, the base tube having a base tube first end and a base tube second end, and an intermediate tube, the intermediate tube including an intermediate tube first end and an intermediate tube second end, the intermediate tube received through the base tube second end, with the intermediate tube second end positioned within the base tube between the base tube first end and the base tube second end, and an outer tube telescopingly received relative to the intermediate tube, the outer tube having an outer tube first end positioned within the intermediate tube, and an outer tube second end positioned exteriorly of the intermediate tube, with the base tube, the intermediate tube, and the outer tube coaxially aligned along a predetermined axis, and a clamp mounted to the base tube second end arranged for selective engagement with the intermediate tube to effect clamping of the intermediate tube relative to the base tube, and the intermediate tube includes an arcuate recess concentric relative to the intermediate tube, with the intermediate tube having an intermediate tube outer wall, and the arcuate recess recessed relative to the outer wall, and an intermediate tube scale plate formed of a magnetic material, with the intermediate tube formed of a ferrous metallic material permitting magnetic adherence of the scale plate relative to the arcuate recess, and the outer tube includes an outer tube scale, and the base tube having a base tube window positioned in adjacency to the clamp, with the window in operative communication with the intermediate tube scale plate, and the window includes a lens coextensive therewith, with the lens having a lens outer wall and a lens inner wall, the lens inner wall positioned in adjacency relative to the intermediate tube scale plate, and a lens end wall, and an illumination housing, the illumination housing including an illumination bulb positioned in adjacency to the lens end wall received within the illumination housing, and at least one battery mounted within the illumination housing, and an on/off switch arranged to effect selective illumination of the illumination bulb to direct illumination through the illumination housing and illumination of the scale plate.

* * * * *